United States Patent [19]
Yoshikawa

[11] Patent Number: 5,870,177
[45] Date of Patent: Feb. 9, 1999

[54] PHOTOGRAPHIC PRINTING APPARATUS

[75] Inventor: Tohru Yoshikawa, Wakayama, Japan

[73] Assignee: Noritsu Koki Co., Ltd., Wakayama, Japan

[21] Appl. No.: 624,513

[22] PCT Filed: Oct. 5, 1994

[86] PCT No.: PCT/JP94/01680

§ 371 Date: Apr. 5, 1996

§ 102(e) Date: Apr. 5, 1996

[87] PCT Pub. No.: WO95/10068

PCT Pub. Date: Apr. 13, 1995

[30] Foreign Application Priority Data

Oct. 6, 1993 [JP] Japan .................................. 5-250685

[51] Int. Cl.⁶ .......................... G03B 27/58; G03B 27/52; G03B 19/00; G03B 1/58
[52] U.S. Cl. ...................... 355/72; 242/332; 242/332.4; 396/512; 355/74; 355/75; 355/76
[58] Field of Search .................................. 396/512, 567, 396/429, 612; 355/72, 74, 75, 76; 242/348, 348.1–348.3, 357

[56] References Cited

U.S. PATENT DOCUMENTS

| | | | |
|---|---|---|---|
| 4,926,211 | 5/1990 | Ozawa | 355/28 |
| 5,229,802 | 7/1993 | Shiota et al. | 354/275 |
| 5,325,144 | 6/1994 | Yoshikawa et al. | 354/319 |
| 5,585,888 | 12/1996 | Tamura et al. | 355/75 |
| 5,612,765 | 3/1997 | Yoshikawa et al. | 355/72 |
| 5,645,240 | 7/1997 | Signoretto | 242/332.4 |

*Primary Examiner*—R. L. Moses
*Assistant Examiner*—Shival Virmani
*Attorney, Agent, or Firm*—Wenderoth, Lind & Ponack

[57] ABSTRACT

A photographic printing apparatus is provided in which a plurality of film cartridges X stored in a cartridge storage 1 are unloaded and transferred one by one to a film table 5 and after reading image data from a film of the cartridge with a scanner module 6 using light from a light source module 4, and printing it on a photosensitive material PC placed on an exposure bed 3c by exposure of light through a lens unit 4b, returned back to the cartridge storage 1.

11 Claims, 13 Drawing Sheets

PHOTOGRAPHIC PRINTING APPARATUS

FIELD OF TECHNOLOGY

The present invention relates to a photographic printing apparatus for printing a cartridge film.

BACKGROUND

Conventional photographic printing apparatuses for printing color images of a film on photosensitive materials are known comprising a scanner unit, a printing exposure means, and film conveying means. In action, printing requirements including image gray levels are optically read by the scanner and used for controlling exposure light emitted to the film from a light source by means of light modulating filters of three primary colors to yield desired gray levels on a photosensitive material.

More particularly, the scanner unit reads image data and its gray levels with an optical sensor detecting rays of light emitted from a light source which is different from the light source for the printing exposure means, and converts it into an electric signal which is then transmitted to the printing exposure means.

The film of which data of image gray levels has been read is conveyed by the film conveying means to the printing exposure means where it is subjected to printing process. The printing requirements are determined by reading the gray level data of all images of the film, and calculating an average gray level from the gray level data of all the images of the film. An optimum printing data of each frame to be printed is hence obtained with reference to the average gray level.

It is common with the conventional photographic printing apparatus that the films are loaded in the apparatus by manually feeding one by one or automatically feeding a chain of the films which have been spliced with one another and wound on a reel of a film feeder. The film is scanned by the scanner unit disposed along a path of the conveying means and its data is used for the printing procedure through exposure of light.

The manual one-by-one feeding of films is a labor concentrated task in which one film is loaded only after the printing procedure of the preceding film is completed, thus requiring at least one operator for engaging a succession of the feeding actions and not allowing a fully automatic mode of the feeding action.

The spliced film feeding also requires an additional time for splicing the films to one another and causes the printing apparatus to be bulky in size.

With the conventional photographic printing apparatus, the film is separated from its patrone before subjected to the printing process and then, handed back to a user in the form of several separated sheets, each having a small number of frames, stored in a known film holder. This will contribute to no efficient business. If the film is not separated but rolled in the patrone, its storage and handling will be much facilitated for the user.

It is an object of the present invention, for overcoming the foregoing disadvantage of the conventional photographic printing apparatus, to provide an improved photographic printing apparatus capable of storing a plurality of film loaded cartridges in a drum, unloading and transferring them one by one to a printing exposure means for printing, and after the printing, returning and loading back without films being separated from their cartridges or spliced with one another, whereby a sequence of the films in their cartridges can be subjected to the printing and handed back to their owners with ease.

DISCLOSURE OF THE INVENTION

For achieving the above object, a photographic printing apparatus according to the present invention comprises: a cartridge storage having a drum provided therein for storing a plurality of film loaded cartridges and driven by a drive unit for carrying the cartridges to an unloading location; a transferring means for unloading and transferring each cartridge from the unloading location to an exposure stage, and after printing by exposure action, returning it to the drum; and a printing exposure means for drawing out a film from its cartridge transferred to the exposure stage, conveying to the other end for winding on a take-up means, and reading various information such as image data and magnetic data from the film during the film being conveyed for printing images of the film on a photosensitive material.

Preferably, the cartridge storage is arranged for mounting and dismounting through a gear disposed on a path for transmitting a rotating force from the drive unit. Also, the transferring means includes a transfer lever which has an L-shaped recess provided therein for holding the cartridge.

The cartridge storage may detachably be mounted to an output shaft of the drive unit and the transferring means includes a pair of cylinders disposed on both sides of the cartridge storage.

The cartridge storage may comprise an endless belt mounted between two sprockets in a casing so that the cartridges loaded in holding spaces defined between the endless belt and the inner wall of the casing can travel in a loop.

It is also possible with any of the first to third arrangements above described that the cartridge storage includes a drum for storing two, inner and outer, rows of the cartridges in the casing, the cartridge transferring means includes two, upper and lower, transfer levers, each having a recess for holding the cartridge, and the drum has a notch provided therein for allowing the two transfer levers to pass across for unloading the cartridge at the unloading location.

Accordingly, the photographic printing apparatus of the present invention allows the film loaded cartridges stored in the cartridge storage to be automatically unloaded and transferred in a succession to the printing exposure means for printing process with exposure of light.

When a desired cartridge is carried to the unloading location by rotating action of the cartridge storage, it is picked up and transferred by the transferring means to the exposure stage. The cartridge is then locked at a film drawing location of the exposure stage, its film is drawn out and conveyed to the other end of the exposure stage for winding on the take-up means.

While the film being conveyed and wound on the take-up means, image data and its relevant magnetic data are read and imparted to printing exposure means for printing the image data on the photosensitive material.

Then, the film is released from the take-up means and returned back into the cartridge which is loaded back to the cartridge storage by the transferring means. This is followed by a succeeding cartridge being carried to the unloading location by the rotating action of the cartridge storage before the above steps are repeated.

After the printing of all the cartridges in the cartridge storage is completed, the cartridge storage is unloaded from the photographic printing apparatus and smoothly replaced with another cartridge storage which holds another group of film loaded cartridges. This results in increase of the efficiency of the overall film printing procedure.

BEST MODES OF EMBODYING THE INVENTION

Embodiments of the present invention will be described referring to the accompanying drawings.
First Embodiment FIG. 1 is a schematic view of the entire arrangement of a photographic printing apparatus showing a first embodiment of the present invention, in which there are provided a cartridge storage 1 for storing a plurality of film cartridges, a printing exposure means 2, and a photosensitive material supplying means 3.

Figure 4:
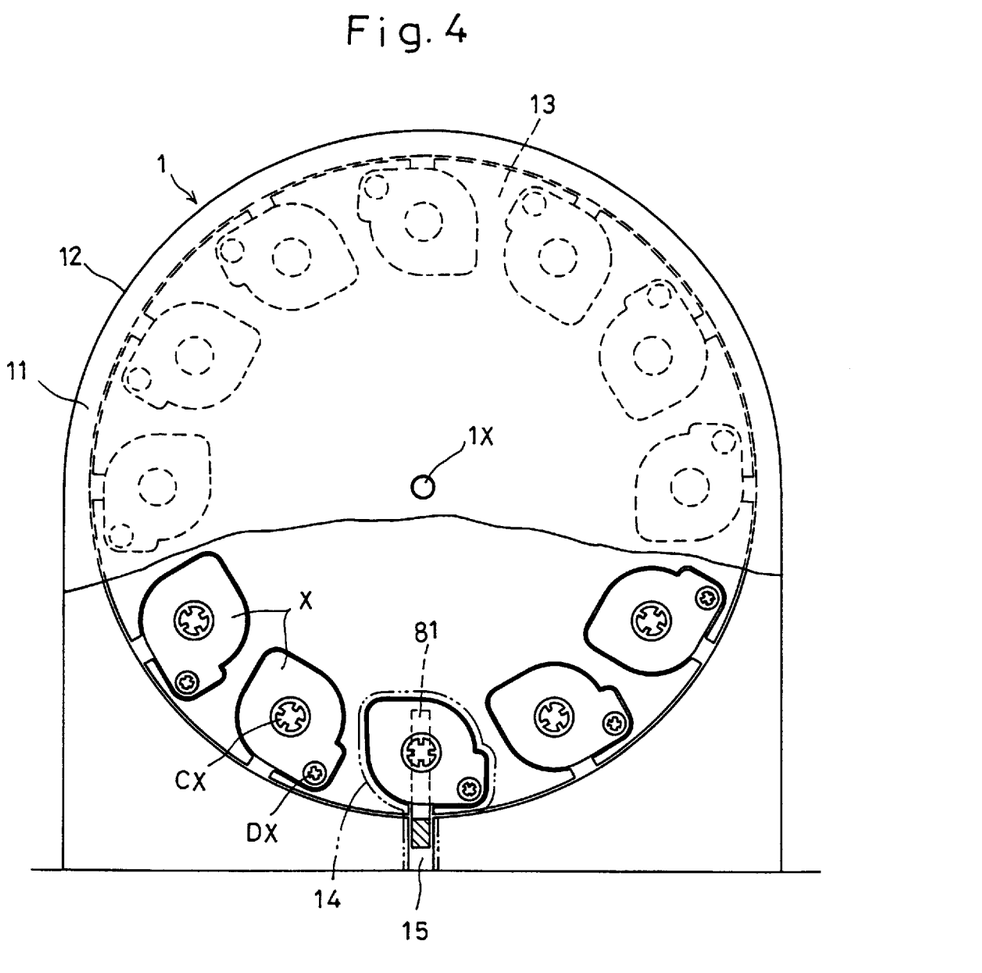
FIG. 4 is a side view seen from the line IV—IV of FIG. 3.
Figure 5:
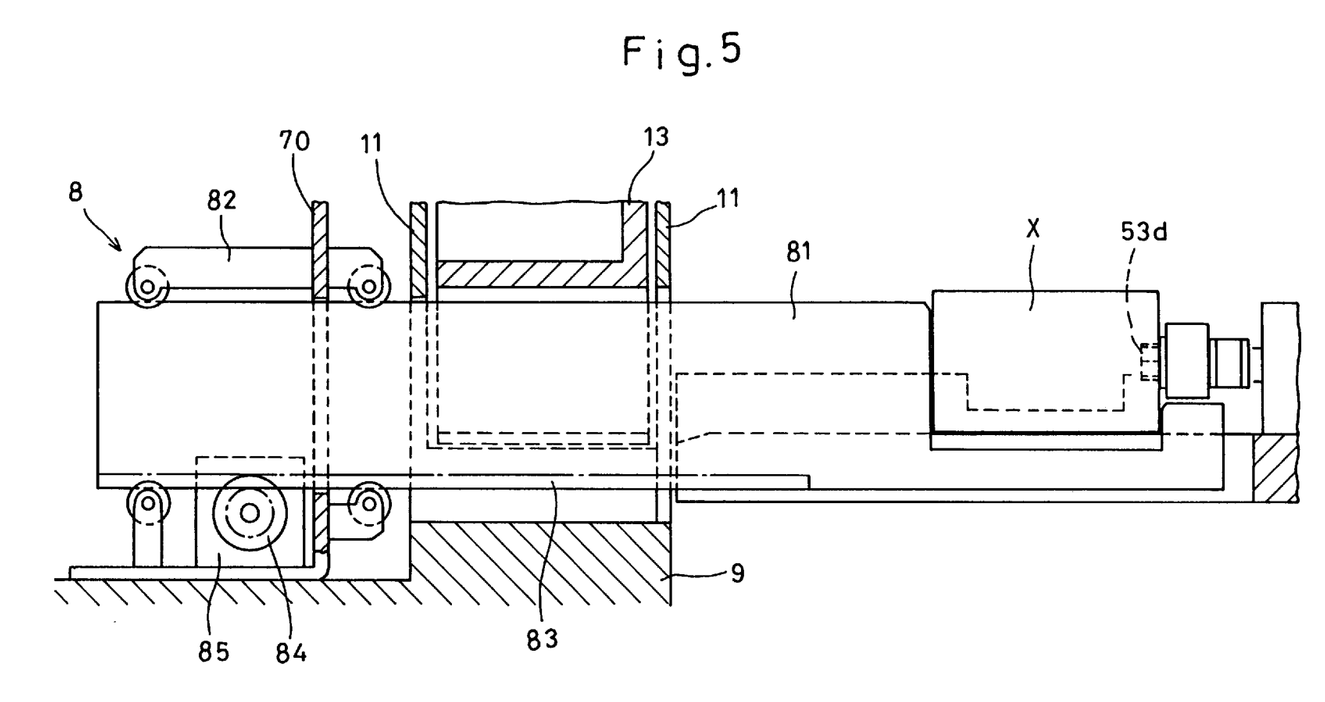
FIG. 5 is a partially enlarged view of the section shown in FIG. 3.

The cartridge storage 1 includes, as shown in FIG. 4, a rotary drum 3 arranged rotatable about a rotation axis 1X and accommodated in a casing 12 which has an openable cover plate 11. The rotary drum 3 has a number (twelve in this embodiment) of apertures 14, of which size is slightly larger than a cartridge X, provided therein for loading the cartridges X. The casing 12 has a notch 15 provided in the lower end thereof for clearing a transfer lever 81 of a cartridge transferring means which will be explained later.

Figure 1:
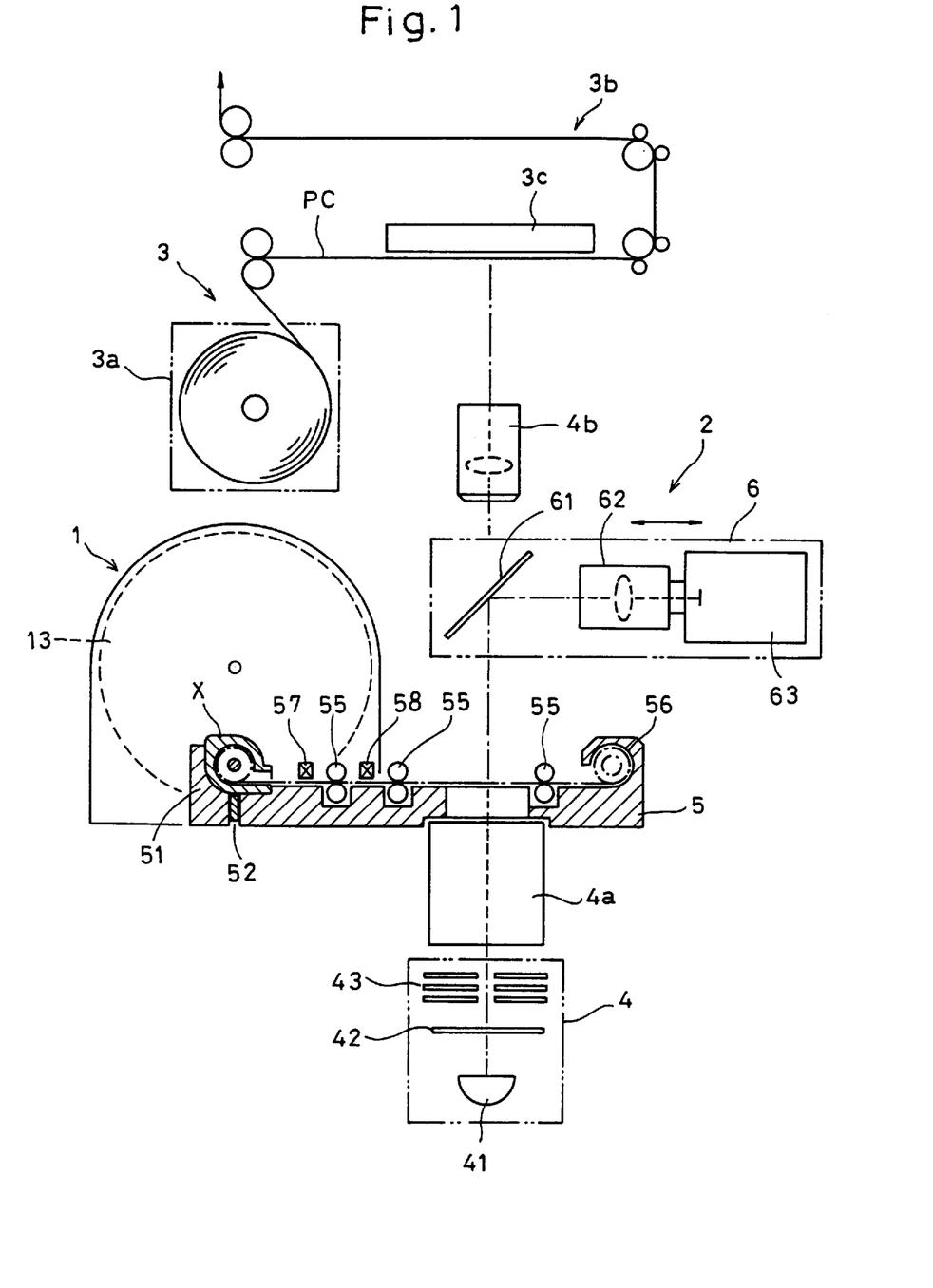
FIG. 1 is a schematic view of the entire arrangement of a photographic printing apparatus showing a first embodiment of the present invention.

The printing exposure means 2 in this embodiment includes a common light source module 4 utilized for both reading image data with a scanner module 6 and exposing a photosensitive material PC to light, as shown in FIG. 1. There are provided a row of a mirror tunnel 4a, a film table 5, the scanner module 6, a lens unit 4b, and an exposure bed 3c across an optical path extending upwardly from the light source module 4 below.

Figure 2:
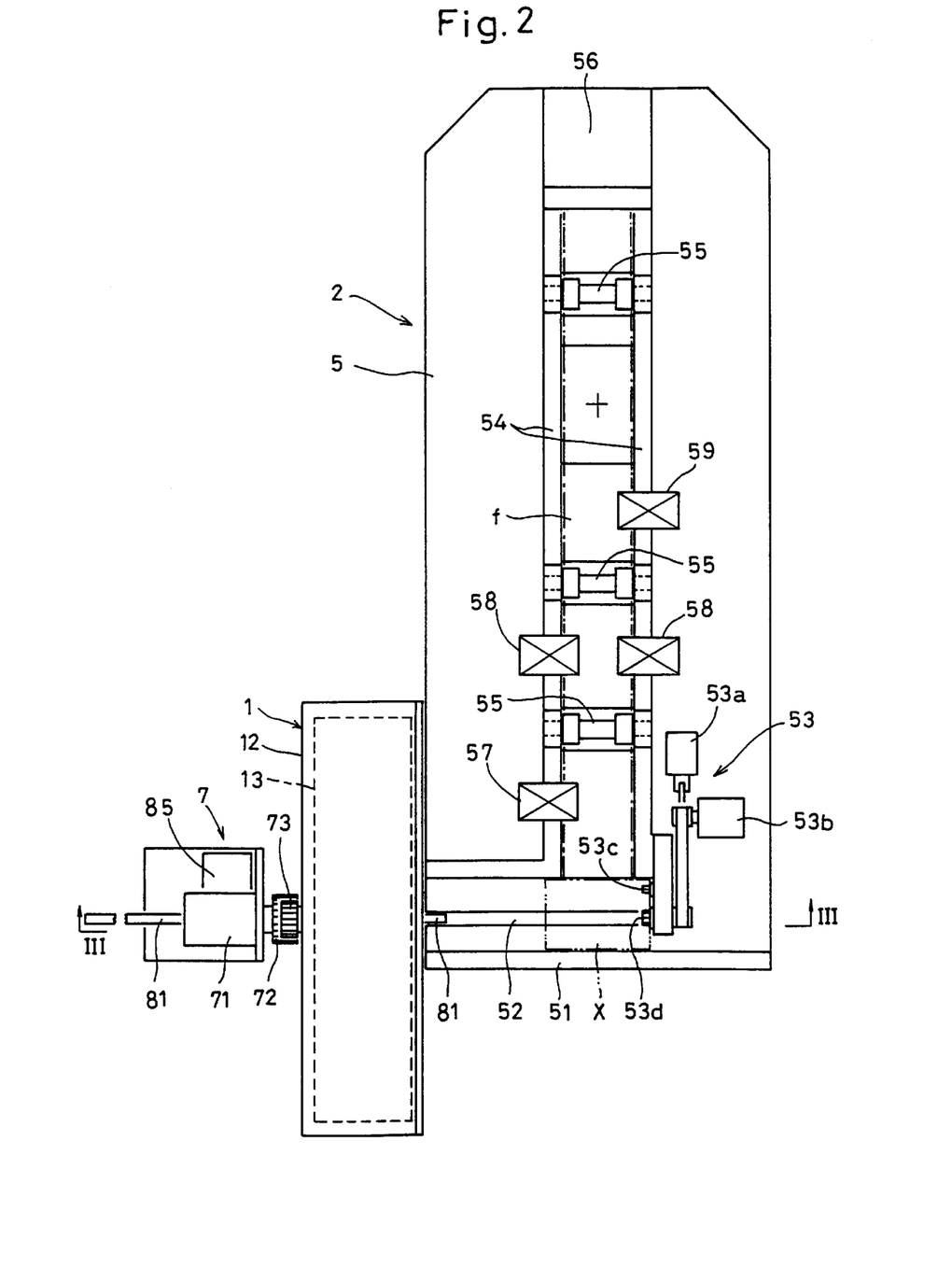
FIG. 2 is a plan view of the same.

The light source module 4 comprises a light source 41, a heat absorbing filter 42, and a light modulating filter 43. The film table 5 includes a guide 51 mounted on lengthwise end thereof for transferring the cartridge X to a film releasing location at the crosswise center of the table 5, and a slot 52 provided therein crosswisely extending along the guide 51. As shown in FIGS. 1 and 2, the slot 52 is provided in and along which the transfer lever of the cartridge transferring means described later is moved forward and backward.

Figure 6:
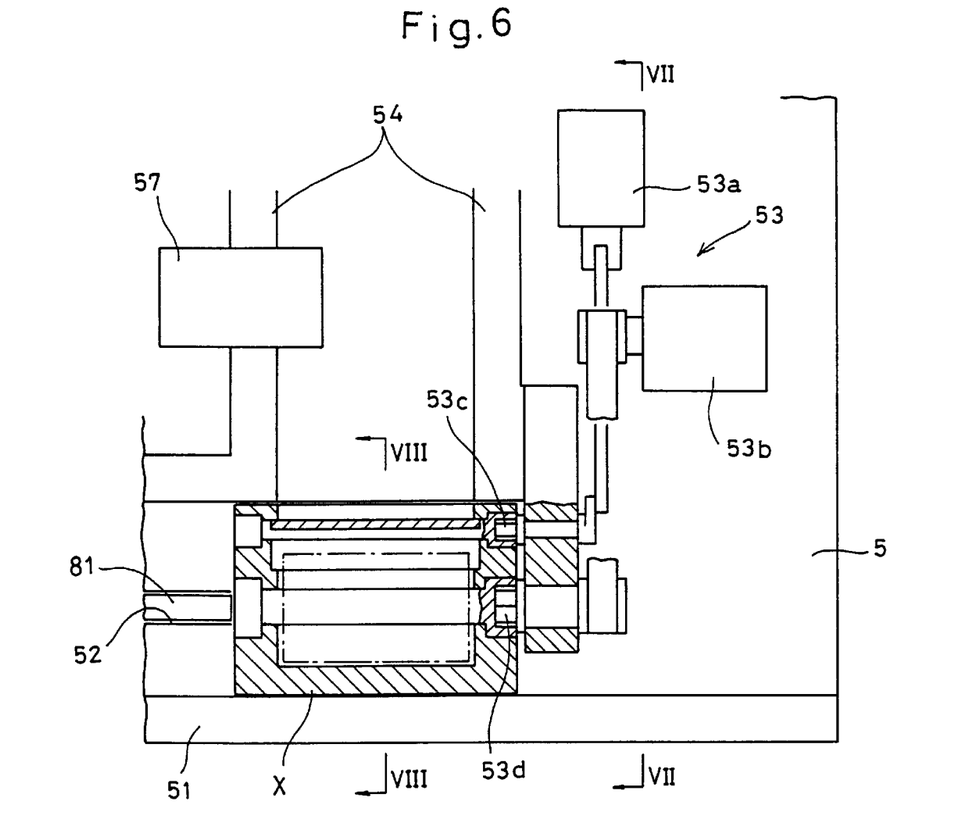
FIG. 6 is a partially enlarged view of the section shown in FIG. 2.
Figure 7:
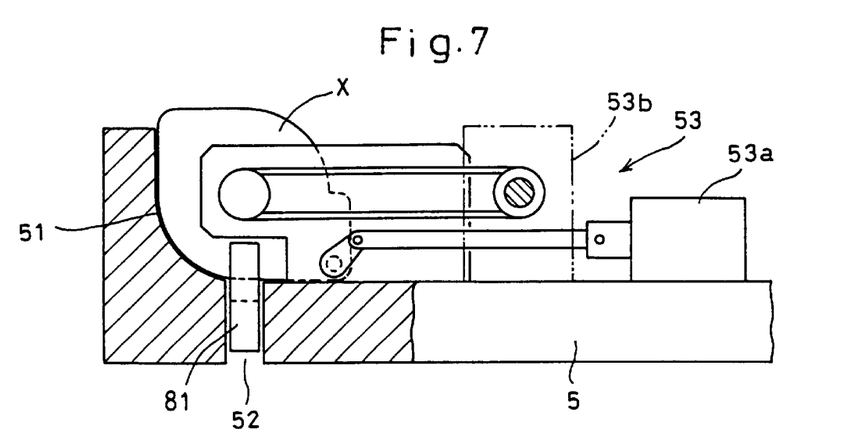
FIG. 7 is a cross sectional view taken along the line VII—VII of FIG. 6.
Figure 8:
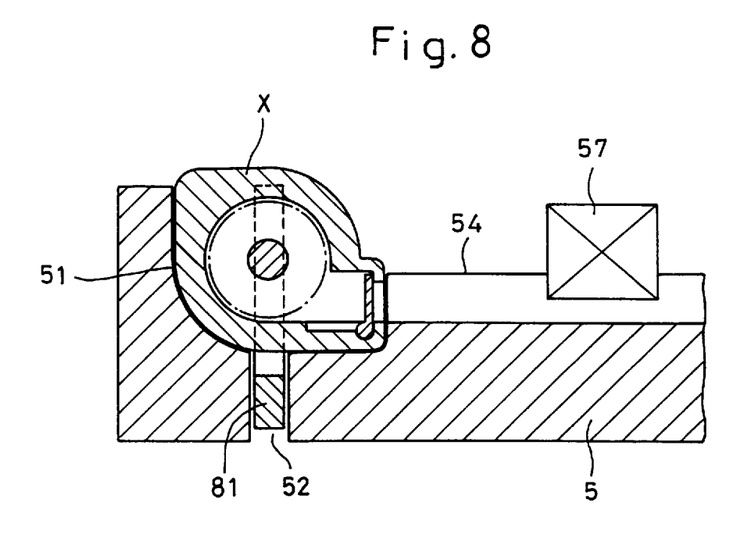
FIG. 8 is a cross sectional view taken along the line VIII—VIII of FIG. 6.

When the cartridge X has been transferred to the film releasing location, its film is drawn out by a drive unit 53 mounted on the film table 5. The drive unit 53 comprises, as shown in FIGS. 4, 6, and 7, a drive motor 53b for feeding and rewinding the film in the cartridge X through an axis linkage hole CX and a reciprocating cylinder 53a for opening and closing a film outlet of the cartridge X through a linkage hole DX. The rotating movement of the drive motor 53b is transmitted to a linkage pin 53d and the reciprocating movement of the reciprocating cylinder 53a is transmitted to a linkage pin 53c.

The film f drawn out from the cartridge X is linearly conveyed along film guides 54 by feed rollers 55 to the other end of the film table 5 and taken up on a take-up reel 56. Referring to FIG. 2, there are mounted along the film guides 54 a perforation detector 57, magnetic heads 58, and a DX code detector 59.

As shown in FIG. 1, the scanner module 6 is movable to and from the light path from the light source module 4 (with a driving means not shown). The scanner module 6 comprises a reflector mirror 61, a lens unit 62, and a scanner 63.

The exposure bed 3c of the photosensitive material supplying means 3 is arranged to receive a tape of a photosensitive material PC supplied by a feeding means 3b from its roll stored in a supply unit 3a and expose it on a frame-by-frame basis to rays of image data light.

Figure 3:
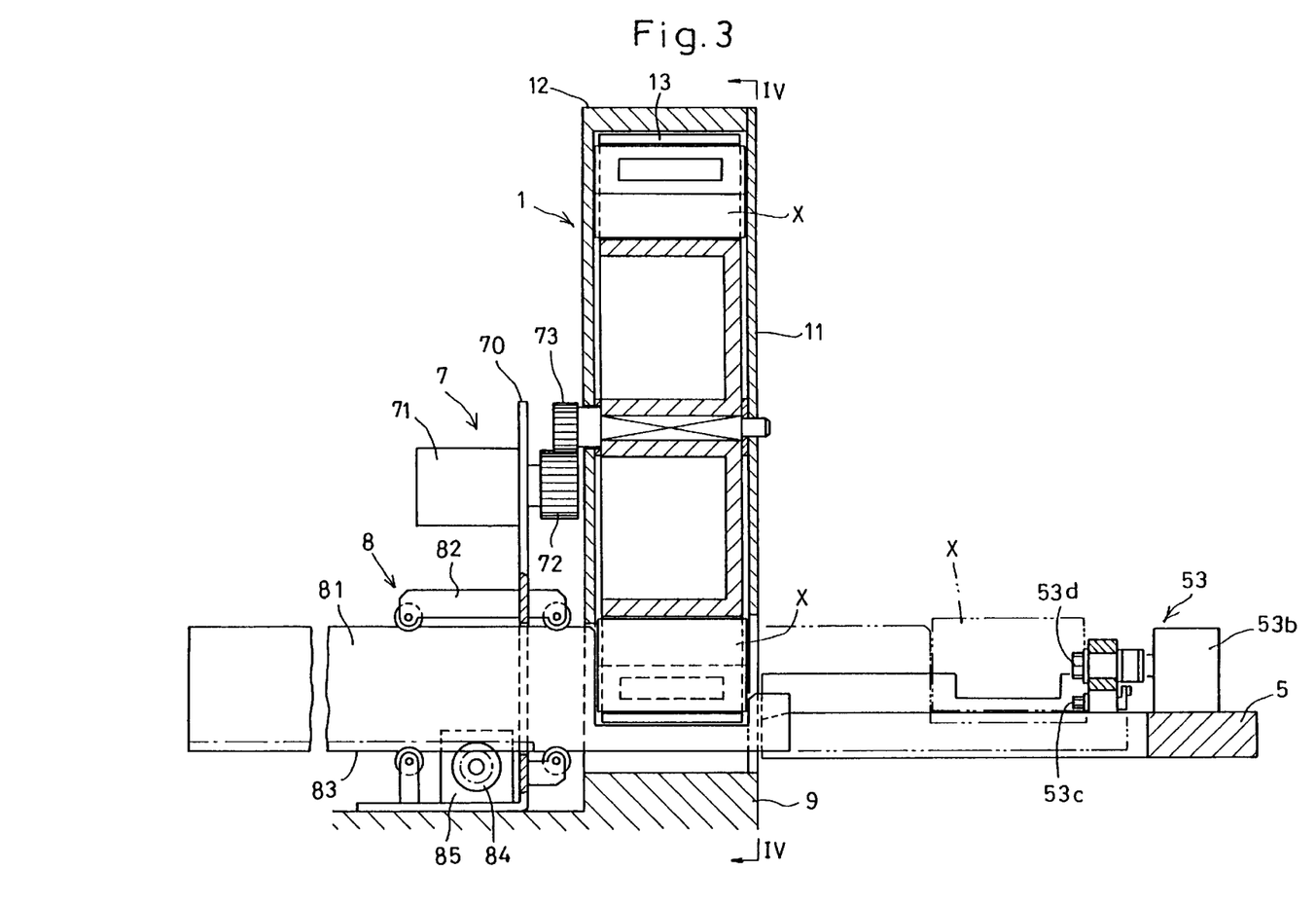
FIG. 3 is a cross sectional view taken along the line III—III of FIG. 2.

The rotary drum 13 of the cartridge storage 1 is driven for rotation by a drive unit 7, as shown in FIGS. 2 and 3.

The drive unit 7 includes a motor 71 mounted on a vertical portion of an L-shaped mounting plate 70 installed on a stationary base 9 and its output is transmitted by toothed wheels 72 and 73 to a rotating shaft 1X.

The cartridge transferring means 8 is mounted perpendicular to the lowermost of the cartridge storage 1 for unloading and transferring the cartridge X in the cartridge storage 1 to the film releasing location on the film table 5. As best shown in FIG. 3, the transfer lever 81 of the cartridge transferring means 8 has a distal end thereof formed of an L shape for holding and transferring the cartridge X.

The transfer lever 81 is moved inward and outward across the notch 15 of the cartridge storage 1 and throughout the slot 52 in the film table 5 as guided horizontally by a guide 82. The inward and outward movement of the transfer lever 81 is conducted by a combination of a rack 83 placed beneath the transfer lever 81 and a pinion 84 arranged in mesh with the rack 83. The pinion 84 is driven by a motor 85.

The printing procedure of the photographic printing apparatus of the first embodiment is as follows:

As shown in FIG. 4, the procedure starts with a desired one of the cartridges X stored in the cartridge storage 1 being selected and located at the lowermost point by rotation of the rotary drum 13. Then, the cartridge X is held by the transfer lever 81 of the cartridge transferring means 8 as denoted by the real line in FIG. 3, and transferred to the film releasing location denoted by the one-dot chain line when the transfer lever 81 is driven by the motor 85. At the feeding location, the linkage pins 53c and 53d of the drive unit 53 are accepted in the linkage holes DX and CX of the cartridge X respectively.

The film outlet of the cartridge X is opened by the action of the reciprocating cylinder 53a and when the drive motor 53b starts rotating, the film f is drawn out from the cartridge X, conveyed along the guides 54, and taken up on the film take-up reel 56 at the other end of the film table 5.

While the film f drawn out from the cartridge X being conveyed from the film releasing location to the take-up reel 56 at the other end of the table 5, the exposure action for printing is performed. For starting the printing exposure action, the scanner module 6 is advanced to locate across the light path from the light source 41, as shown in FIG. 1, upon the cartridge X being set at the film releasing location.

As the film f is fed out from the cartridge X, a frame image on the film f is detected by the perforation detector 57 and its magnetic data and latent barcode are read by the magnetic heads 58 and the DX code detector 59 respectively. The gray levels of each frame image are also read by the scanner module 6 and transmitted together with the read-out data to a computer (not shown) for common processing operations including calculation of an average gray level, which are well known and will be described in no more details.

When the film f has thoroughly been read of gray level data, it is returned into the cartridge X from the take-up reel 56 and the scanner module 6 is moved backward from its light path location shown allowing light from the light source 41 to run through the lens unit 4b.

The film f returned into the cartridge X is again drawn out for projecting and printing its frame images frame by frame on to the photosensitive material PC placed on the exposure bed 3c. The printing of each frame image is carried out by controlling its gray level with the average gray level calculated from the read-out data.

After the printing of all the frame images on the film f is completed, the film f is rewound in the cartridge X and the cartridge X is loaded back on to the cartridge storage 1 by a reverse of the described manner. Upon the cartridge X being returned to its original position, the rotary drum 13 in the cartridge storage 1 is rotated to carry a succeeding cartridge X to the lowermost point. The succeeding cartridge X is then transferred to the film table 5 and subjected to the same printing procedure.

As all the cartridges X in the rotary drum 13 have been subjected to the printing process, the rotary drum 13 is stopped and the cartridge storage 1 is lifted and removed from the drive unit 7.

When another cartridge storage holding a group of cartridges is prepared and loaded in place of the cartridge storage 1, the printing procedure is repeated without loss of time.

The processed cartridges X stored in the rotary drum 13 of the cartridge storage 1 are easily unloaded when the cover 1a is opened. As the cartridges X are stored in a sequence of loading, they may be unloaded in the same sequence for ease of further handling.

Second Embodiment

Figure 9:
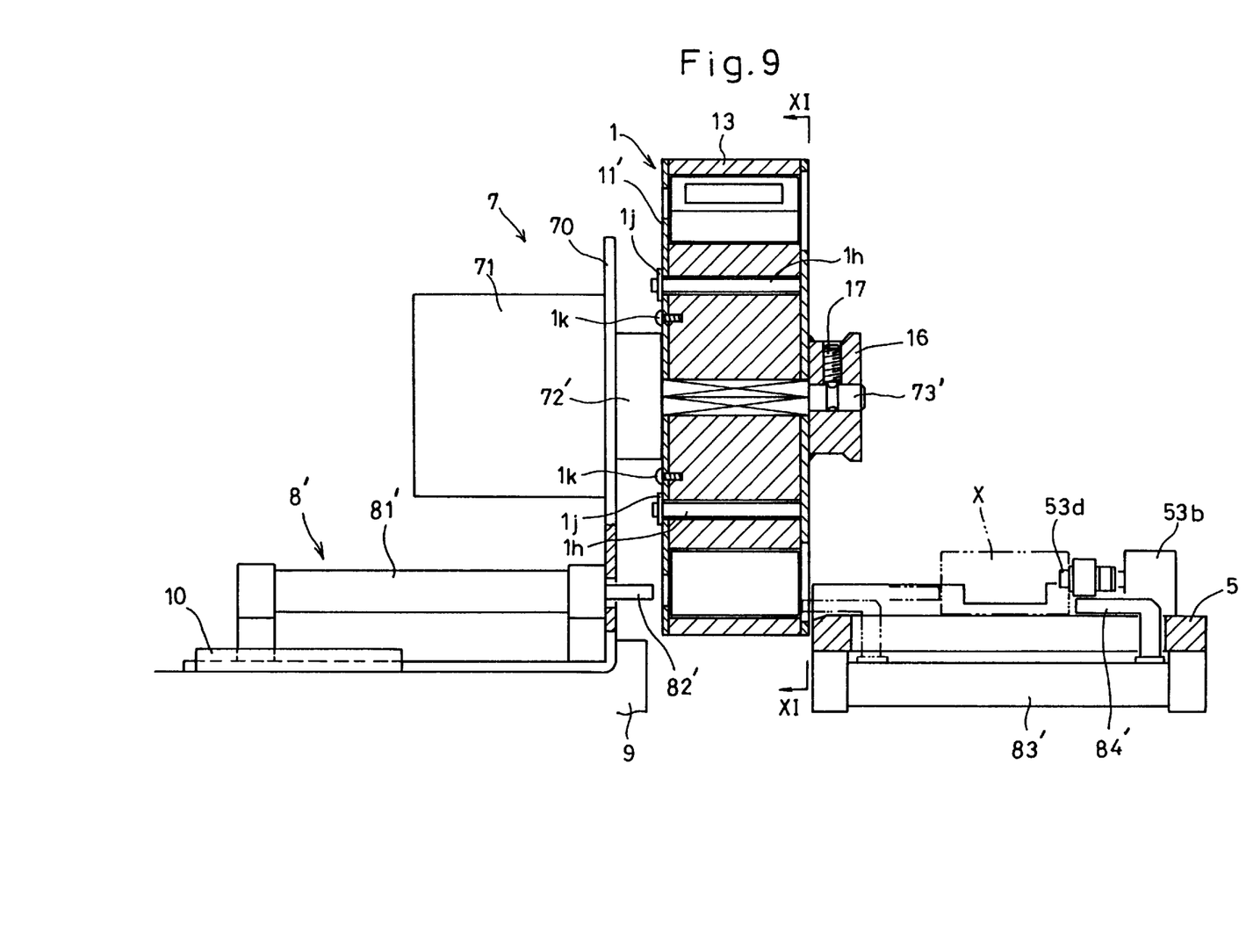
FIG. 9 is a cross sectional view of primary part of a second embodiment of the present invention.
Figure 10:
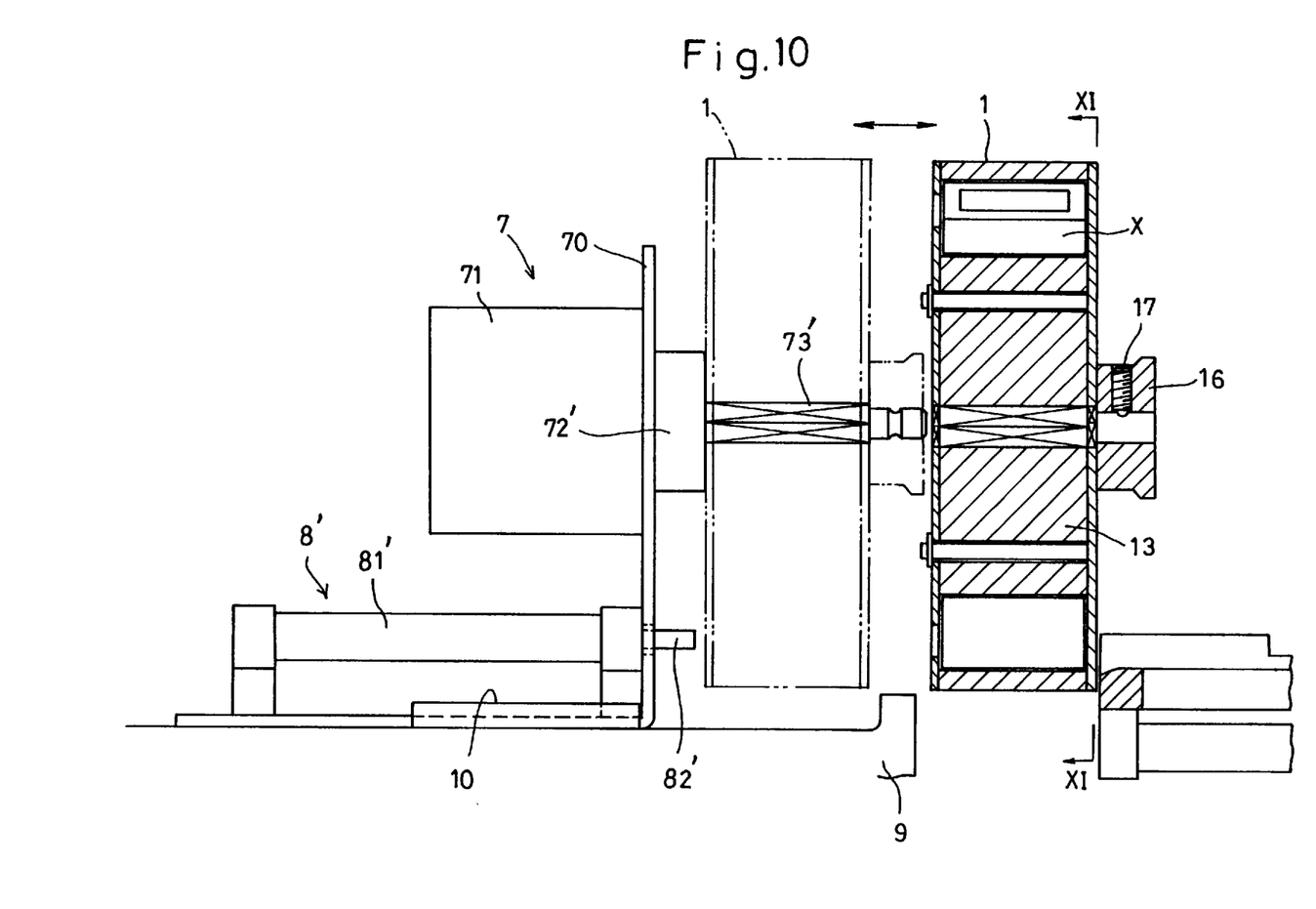
FIG. 10 is an explanatory view showing an action of the same.

FIGS. 9 to 11 illustrate a second embodiment of the present invention. The second embodiment will be described of a part differentiated from the first embodiment. It should be noted that unshown regions are constructed in the same arrangement as of the first embodiment. As apparent from FIG. 9, the cartridge storage 1 of this embodiment is directly joined to an output shaft 73' of the motor 71 of the drive unit 7.

The rotary drum 13 is mounted between a front cover disk 11 and a rear cover disk 11'. The output shaft 73' of the motor 71 is fitted into and joined to a boss 16 fixedly mounted to the front cover disk 11. A main portion of the output shaft 73' extending through the center of the rotary drum 13 is a square in cross section. There is a ball plunger 17 fitted through a slot in the boss 16 into a recess of the output shaft 73' for preventing the boss 16 from slipping off the output shaft 73'. Denoted by 72' is a holder member.

Accordingly, the cartridge storage 1 directly receives the rotating force of the motor 71 as is mounted on the output shaft 73' of the motor 71, but requires the removal of the drive unit 7 before dismounted from the output shaft 73', as shown in FIG. 10. This causes the transfer lever 81 of the first embodiment to be not applicable.

For compensation, the second embodiment employs another cartridge transferring means 8' which comprises a pair of (rodless) cylinders 81' and 83' disposed on both sides of the cartridge storage 1 for driving the cartridge X in opposite directions. In addition, a guide 10 is mounted on the stationary bed 9 for allowing the mounting plate 70 to move along the stationary bed 9. The mounting plate 70 is moved by a drive unit not shown.

The cylinder 81' has a rod 82' thereof for unloading and transferring the cartridge X from the cartridge storage 1 to the film releasing location denoted by the one-dot chain line in FIG. 9. The other cylinder 83' is mounted to the lower side of the end of the film table 5 and has an L-shaped arm 84' thereof for pressing the cartridge X in the opposite direction to the transferring direction up to its loading position in the storage cartridge 1. The arm 84' of the cylinder 83' moves in and along a slot identical in shape and location to the slot 52 of the first embodiment. The slot of the second embodiment is however increased in the length as shown in FIG. 9.

The rear cover disk 11' is tightened by screws 1K to the rotary drum 13. The front cover disk 11 is joined to the rotary drum 13 by rods 1h which are locked at one end to the front cover disk 11 and extend across the rotary drum 13 to the rear cover disk 11'. An E ring 1j is mounted to the rear side of each rod 1h so that the front cover disk 11 is turnable through a given angle relative to the rotary drum 13. More specifically, the rod 1h extends through and is movable in a slot provided in the rotary drum 13.

Figure 11A:
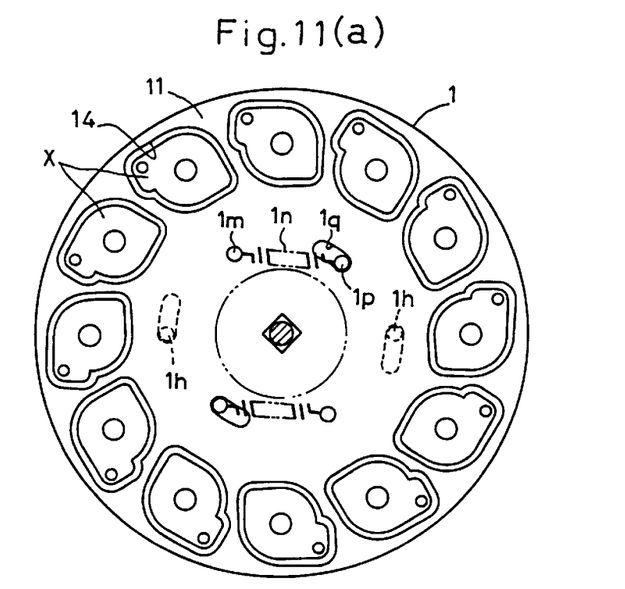
FIG. 11 is an explanatory view showing an action of the same.
Figure 11B:
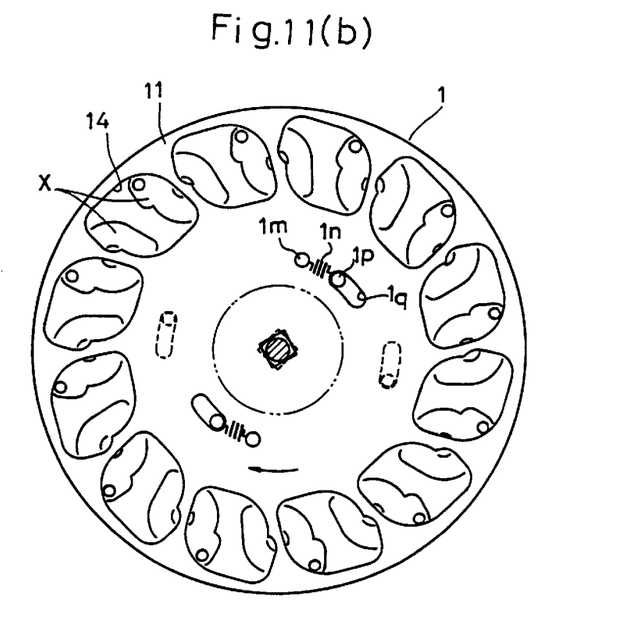

As shown in FIG. 11, there are pins 1m, springs 1n, pins 1p, and slots 1q provided on the front cover disk 11. The pin 1p is fixedly mounted to the rotary drum 13 as fitted through the slot 1q provided in the front cover disk 11. When the cartridge storage 1 is removed from the output shaft 73' of the motor 71, the front cover disk 11 is turned by the yielding force of the springs 1n in the direction denoted by the arrow in FIG. 11(b) thus causing its apertures 14 to dislocate from the cartridges X stored in the drum 13. This prevents the cartridges X from dropping off from the drum 13 while the cartridge storage 1 being removed.

For mounting back the cartridge storage 1 on to the motor output shaft 73', the front cover disk 11 is slightly turned in the opposite direction against the rotary drum 13 so that its square center hole meets the square shape of the output shaft 73', as shown in FIG. 11(a).

The film transfer procedure of the second embodiment is substantially identical to that of the first embodiment. The second embodiment is characterized in that the unloading and loading of the cartridges X on the cartridge storage 1 are conducted by the two cylinders 81' and 83' and the cartridge storage 1 itself is detachably mounted on the output shaft 73' of the motor 71.

Third Embodiment

Figure 12:
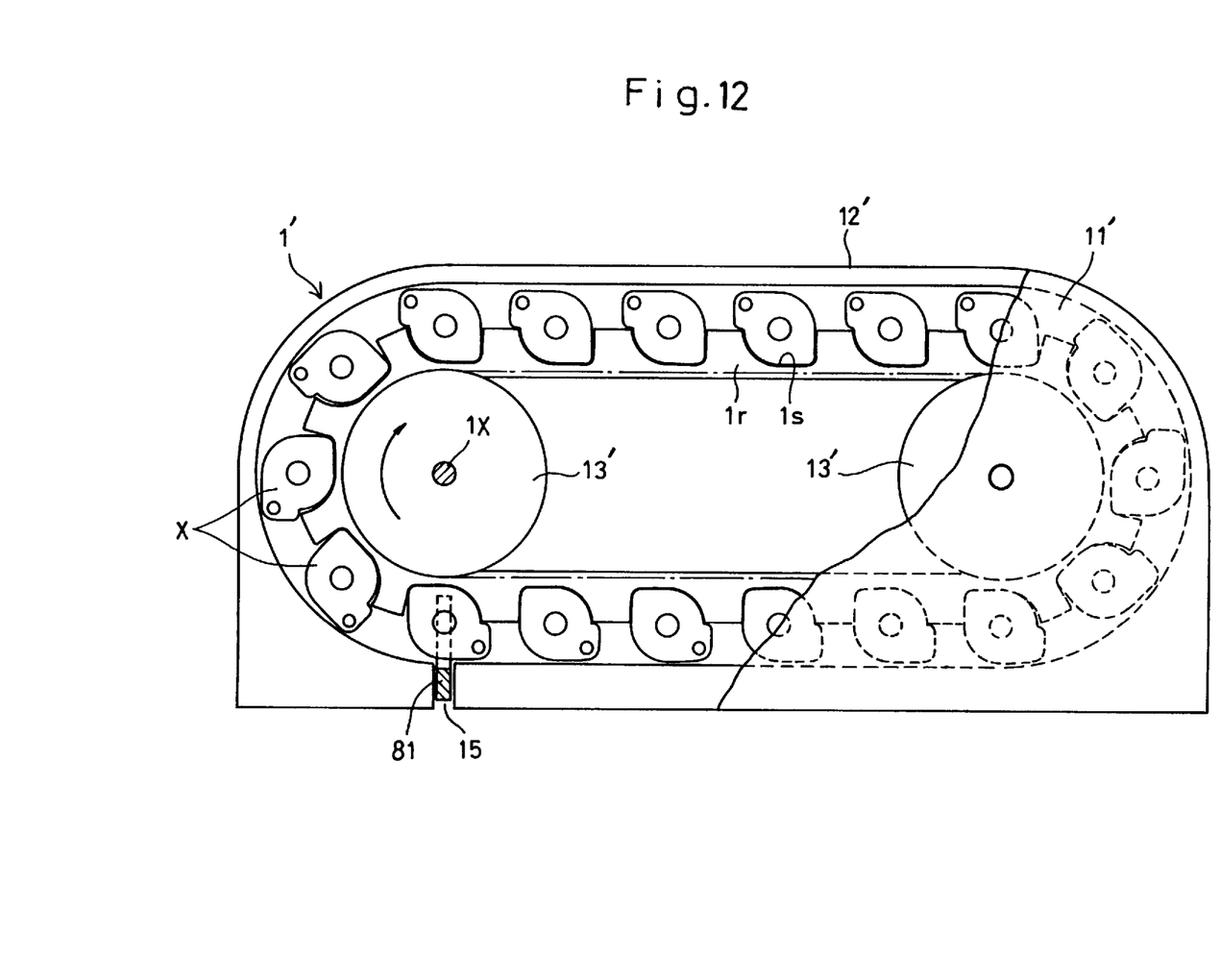
FIG. 12 is a side view showing a primary part of a third embodiment of the present invention.

FIG. 12 shows a schematic view of a cartridge storage 1' according to a third embodiment of the present invention. The other arrangement not shown is identical to that of the first embodiment. The third embodiment is distinguished from the first embodiment by the fact that the cartridge storage 1' includes an endless belt 1r, rather than the rotary drum 13, mounted between two sprockets 13' for looping movement. The endless belt 1r has a series of recesses 1s for holding the cartridges X so that the cartridges X circulate in the interior of the casing 12.

Also, a notch 15 is provided for allowing the transfer lever 81 to unload and transfer the cartridge X which has been conveyed to the location of the notch 15 by rotation of a rotating shaft 1X. Other actions are identical to those explained with the first embodiment.

Fourth Embodiment

Figure 13:
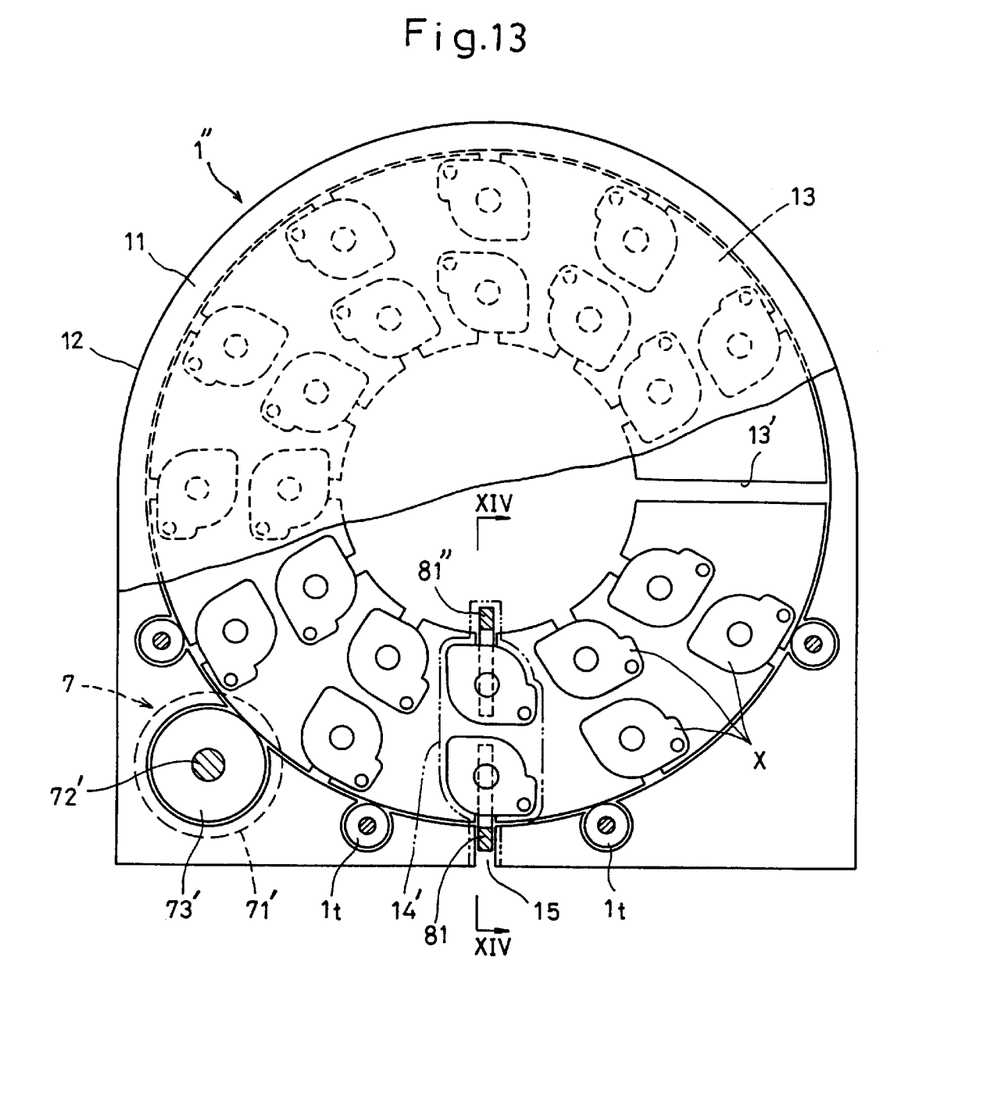
FIG. 13 is a side view showing a primary part of a fourth embodiment of the present invention.
Figure 14:
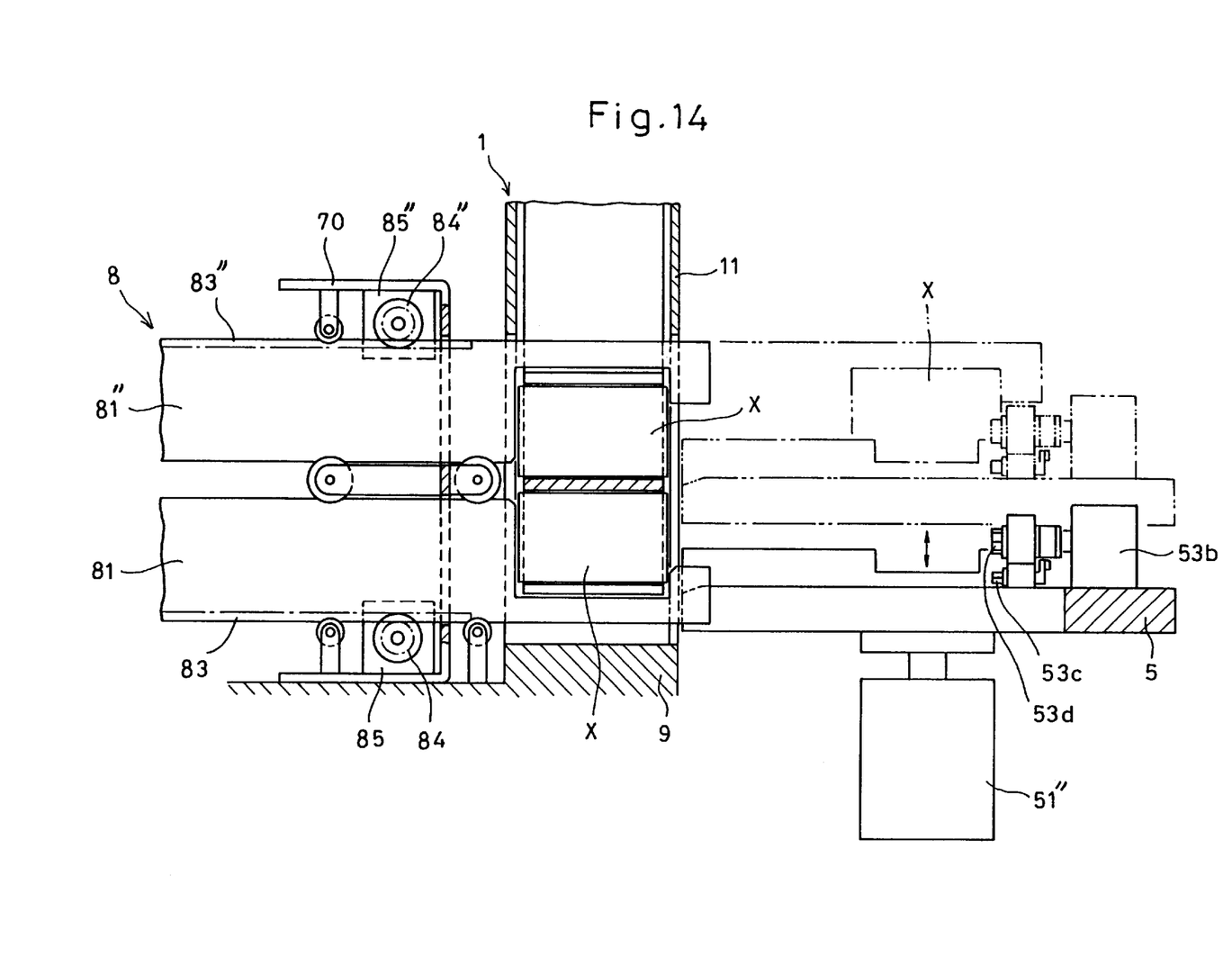
FIG. 14 is a cross sectional view of the primary part of the fourth embodiment.

FIGS. 13 and 14 illustrate schematic constructions according to a fourth embodiment of the present invention. The other arrangement not shown is identical to that of the first embodiment. The fourth embodiment is characterized in that a cartridge storage 1" of the rotary drum type is modified for storing two circular rows of the cartridges X (and thus called as of double type).

The rotary drum 13 has a slit 13' therein and a round space provided in the center thereof, as shown in FIG. 13. The rotary drum 13 is driven by a roller 73' friction engaged therewith and mounted to the rotary shaft 72' of a motor 71' in the drive unit 7.

At the location of a notch 15, provided are two, upper and lower, transfer levers 81 and 81" in the cartridge transferring means 8. FIG. 14 is a cross sectional view taken along the line XIV—XIV of FIG. 13. As apparent, the film table 5 is lifted up and down by a motor 51" for unloading the cartridges X from their two, inner and outer, storage locations in the rotary drum 13. For unloading and transferring the cartridge X from the inner storage location, the film table 5 is lifted up to the level denoted by the one-dot chain line in FIG. 14.

The two, upper and lower, transfer levers 81 and 81" are guided by a guide 82 and provided with racks 83 and 83" respectively which are arranged in mesh with and driven by pinions 84 and 84" joined to their respective motors 85 and 85".

The film table 5 may be lifted up and down either of the entirety or of one end portion. When the film table 5 has been loaded with the cartridge X at its upper level, it is lifted down to the lower level where the further printing process is carried out.

Possible Industrial Applications

As set forth above, the photographic printing apparatus of the present invention allows a plurality of film cartridges loaded and stored in its cartridge storage to be unloaded and transferred one by one to a given location where a film is drawn out from the cartridge and carried to the printing exposure means for printing through exposure of light on a sheet of photosensitive material. Accordingly, since the film is not spliced nor separated from its cartridge, and after the printing process, returned back with its cartridge to the cartridge storage, the cartridges will be handled in a sequence without missing up the order. Also, the cartridge storage is arranged detachable and replaced with another film loaded cartridge storage upon finishing its exposure action. The printing procedure will hence be increased in the efficiency thus contributing to the automatic operation.

What is claimed is:

1. A photographic printing apparatus comprising: a cartridge storage having a drum provided therein for storing a plurality of film loaded cartridges and driven by a drive unit for carrying the cartridges to an unloading location; a transferring means for unloading and transferring each cartridge from the unloading location to an exposure stage, and returning the cartridge to the drum after printing by exposure action; and a printing exposure means for drawing out a film from the cartridge transferred to the exposure stage, conveying the film to the other end for winding on a take-up means, and reading various information such as image data and magnetic data from the film during the film being conveyed for printing images of the film on a photosensitive material.

2. A photographic printing apparatus according to claim 1, wherein the cartridge storage is arranged for mounting and dismounting through a gear disposed on a path for transmitting a rotating force from the drive unit.

3. A photographic printing apparatus according to claim 1, wherein the transferring means includes a transfer lever which has an L-shaped recess provided therein for holding the cartridge.

4. A photographic printing apparatus according to claim 1, wherein the cartridge storage is detachably mounted to an output shaft of the drive unit and the transferring means includes a pair of cylinders disposed on both sides of the cartridge storage.

5. A photographic printing apparatus according to claim 1, wherein the cartridge storage comprises an endless belt mounted between two sprockets in a casing so that the cartridges loaded in holding spaces defined between the endless belt and the inner wall of the casing can travel in a loop.

6. A photographic printing apparatus according to claim 3, wherein the cartridge storage includes a drum for storing two, inner and outer, rows of the cartridges in the casing, the cartridge transferring means includes two, upper and lower, transfer levers, each having a recess for holding the cartridge, and the drum has a notch provided therein for allowing the two transfer levers to pass across for unloading the cartridge at the unloading location.

7. A photographic printing apparatus according to claim 2, wherein the transferring means includes a transfer lever which has an L-shaped recess provided therein for holding the cartridge.

8. A photographic printing apparatus according to claim 2, wherein the cartridge storage comprises an endless belt mounted between two sprockets in a casing so that the cartridge loaded in holding spaces defined between the endless belt and the inner wall of the casing can travel in a loop.

9. A photographic printing apparatus according to claim 3, wherein the cartridge storage comprises an endless belt mounted between two sprockets in a casing so that the cartridge loaded in holding spaces defined between the endless belt and the inner wall of the casing can travel in a loop.

10. A photographic printing apparatus according to claim 7, wherein the cartridge storage comprises an endless belt mounted between two sprockets in a casing so that the cartridge loaded in holding spaces defined between the endless belt and the inner wall of the casing can travel in a loop.

11. A photographic printing apparatus according to claim 7, wherein the cartridge storage includes a drum for storing two, inner and outer, rows of the cartridges in the casing, the cartridge transferring means includes two, upper and lower, transfer levers, each having a recess for holding the cartridge, and the drum has a notch provided therein for allowing the two transfer levers to pass across for unloading the cartridge at the unloading location.

* * * * *